United States Patent [19]
Wynn et al.

[11] Patent Number: 5,831,803
[45] Date of Patent: Nov. 3, 1998

[54] OVERCURRENT PROTECTION CIRCUIT

[75] Inventors: Craig Wynn, Palo Alto; St. Elmo Nickols, III, Los Gatos, both of Calif.

[73] Assignee: Raychem Corporation, Menlo Park, Calif.

[21] Appl. No.: 867,682

[22] Filed: Jun. 2, 1997

[51] Int. Cl.⁶ .................................................. H02H 3/00
[52] U.S. Cl. ............................ 361/7; 361/9; 361/93; 361/106; 361/166; 361/187
[58] Field of Search .................................. 361/93, 79, 58, 361/166, 187, 3, 5–9, 13, 106; 338/22 R

[56] References Cited

U.S. PATENT DOCUMENTS 5,666,254  9/1997  Thomas et al. .............................. 361/8
5,689,395  11/1997  Duffy et al. ................................ 361/93
5,737,160  4/1998  Duffy ........................................ 361/3

*Primary Examiner*—Jeffrey A. Gaffin
*Assistant Examiner*—Michael J. Sherry
*Attorney, Agent, or Firm*—Timothy H. P. Richardson; Marguerite E. Gerstner; Herbert G. Burkard

[57] ABSTRACT

A circuit protection system employing arrangements of PTC devices and mechanical switches. The PTC device is not involved in the circuit until a fault is sensed. A current sensing relay senses an overcurrent and directs the current to the PTC device. As the voltage across the PTC device increases, a parallel arrangement of voltage sensing relays completes the operation of the protection system, and disconnects the load until the protection system is reset. The protection system may be reset manually or remotely.

7 Claims, 3 Drawing Sheets

OVERCURRENT PROTECTION CIRCUIT

RELATED APPLICATIONS

This application is related to commonly assigned provisional applications Nos. 60/003,733, 60/003,732, 60/003,731, 60/003,743; commonly assigned copending U.S. patent application Ser. No. 08/564,465; and U.S. Pat. Nos. 5,689,395; 5,666,254; and 5,737,160, the disclosures of which are incorporated herein by reference for all purposes.

BACKGROUND OF THE INVENTION

1. Field of the Invention

This invention relates to electrical circuit overcurrent protection.

2. Introduction to the Invention

PTC circuit protection devices are well known. The device is placed in series with a load, and under normal operating conditions is in a low temperature, low resistance state. However, if the current through the PTC device increases excessively, and/or the ambient temperature around the PTC device increases excessively, and/or the normal operating current is maintained for more than the normal operating time, then the PTC device will be "tripped," i.e. converted to a high temperature, high resistance state such that the current is reduced substantially. Generally, the PTC device will remain in the tripped state, even if the current and/or temperature return to their normal levels, until the PTC device has been disconnected from the power source and allowed to cool. Particularly useful PTC devices contain a PTC element which is composed of a PTC conductive polymer, i.e. a composition which comprises (1) an organic polymer, and (2) dispersed, or otherwise distributed, in the polymer, a particulate conductive filler, preferably carbon black. PTC conductive polymers and devices containing them are described, for example in U.S. Pat. Nos. 4,237,441, 4,238,812, 4,315,237, 4,317,027, 4,426,633, 4,545,926, 4,689,475, 4,724,417, 4,774,024, 4,780,598, 4,800,253, 4,845,838, 4,857,880, 4,859,836, 4,907,340, 4,924,074, 4,935,156, 4,967,176, 5,049,850, 5,089,801 and 5,378,407, the disclosures of which are incorporated herein by reference for all purposes.

U.S. Pat. No. 5,689,395 and equivalent International Application No. PCT/US96/14686, published as International Publication No. WO97/10637 on Mar. 20, 1997, discloses overcurrent protection systems which are particularly useful when a circuit is to be protected from relatively small overcurrents. In those systems, a control element and a circuit interruption element are placed in series with the load. The control element is functionally linked to the circuit interruption element, so that, when the current in the circuit exceeds a predetermined amount, the control element senses the overcurrent and causes the circuit interruption element to change from a relatively conductive state to a relatively nonconductive state (including a completely open state).

In preferred embodiments, protection systems in accordance with the invention disclosed in U.S. Pat. No. 5,689,395 employ arrangements of PTC devices and mechanical switches to safely interrupt overcurrents, with other devices, e.g. relay coils and/or Hall effect devices, used to sense the current and voltage levels and assist in the coordination of the operation of the protection systems. Such arrangements have the feature that the PTC device is not involved in the circuit until a fault is sensed. There is therefore no requirement for the PTC device to both carry current continuously and respond to a fault condition.

However, while providing a safe and effective means to interrupt overcurrents, the embodiments disclosed in U.S. Pat. No. 5,689,395 may require additional components to coordinate the operation of the protection systems under certain circumstances.

SUMMARY OF THE INVENTION

In the development of systems of the type described in U.S. Pat. No. 5,689,395, we have devised a novel electrical system which can be connected between an electrical power supply and an electrical load to form an operating circuit, and which when so connected protects the circuit from overcurrents, the system having a normal operating condition and a fault condition, and comprising:

(1) a current sensing means having
  (a) a current deenergized state, when the current passing through it does not exceed a normal current, $I_{NORMAL}$, by a predetermined current amount, and
  (b) a current energized state, when the current passing through it has exceeded the normal current, $I_{NORMAL}$, by the predetermined current amount;

(2) a first circuit switch which is coupled with the current sensing means and which is
  (a) closed when the current sensing means is in the current deenergized state, and
  (b) open when the current sensing means is in the current energized state;

(3) a voltage sensing means having
  (a) a voltage deenergized state when the voltage across the voltage sensing means does not exceed a predetermined voltage amount, and
  (b) a voltage energized state when the voltage across the voltage sensing means exceeds the predetermined voltage amount;

(4) a PTC device; and (5) a second circuit switch which is coupled with the voltage sensing means and which is
  (a) closed when the voltage sensing means is in the voltage deenergized state, and
  (b) open when the voltage sensing means is in the voltage energized state;

the first circuit switch and the PTC device being connected in parallel with each other; the second circuit switch being connected in series with the parallel combination of the first circuit switch and the PTC device; and the voltage sensing means being connected in parallel with the series combination of (i) the second switch and (ii) the parallel combination of the first circuit switch and the PTC device.

An example of a circuit including such a system is shown in FIG. 1 of the accompanying drawings. The novel system is similar to the system shown in FIG. 2c of U.S. Pat. No. 5,689,395, but, has the advantage that opening of the second circuit switch transfers the system voltage to the voltage sensing means. This ensures that the second circuit switch continues to open and remains open. The system shown in FIG. 2c of U.S. Pat. No. 5,689,395 has the disadvantage that opening of the second circuit switch removes the voltage from the voltage sensing means. This may cause the contacts of a conventional relay to "chatter" and necessitate the use of some measure to prevent this, e.g. the use of a make-before-break relay.

The level (current or voltage, as the case may be) at which a relay energizes (e.g., switches from a normally open position to a closed position, or from a normally closed position to an open position, as the case may be) is often referred to as the "pull-in" level. Similarly, the level (current or voltage, as the case may be) at which a relay deenergizes (e.g. switches from a closed position to a normally open position, or from an open position to a normally closed position, as the case may be) is often referred to as the "drop-out" level.

It is preferred in a system of this kind that the current sensing relay (or other sensing means) have a pull-in level which is not far above the maximum operating current level (e.g., not more than 5 times, particularly not more than 3 times, especially not more than 2 times) to provide the desired overcurrent protection. It is also preferred in a system of this kind that the current sensing relay (or other sensing means) have a drop-out level which is not far above the maximum operating current level of the circuit to avoid triggering the protection system on short transient overcurrents. This is illustrated in the curves shown in FIGS. 2A and 2B. In the curve shown in FIG. 2A, the drop-out level of the current sensing means is below the normal operating level of the circuit. Thus, in the event of a transient, such as is depicted in FIG. 2A, the current sensing means will pull-in when the transient exceeds the pull-in level, but, since the normal operating current level is above the drop-out level, the current sensing means will not drop-out, and thus will remain energized. In protection systems of this kind, such would cause the PTC device the heat up and increase its resistance, thereby causing the voltage sensing relay (or other second circuit switch) to open.

In order to avoid this situation, i.e. to prevent triggering on such transients, the pull-in and drop-out levels of the current sensing relay may have relationships as depicted in FIG. 2B. In the curve shown in FIG. 2B, the drop-out level of the current sensing means is above the normal operating level of the circuit. Thus, in the event of a transient, such as is depicted in FIG. 2B, the current sensing relay will pull in when the transient exceeds the pull-in level, but will then quickly drop-out when the current falls back below the drop-out level. With the current sensing relay pulled-in for a very brief time, the PTC device will not heat up sufficiently to cause the voltage sensing relay to open. Hence, the protection system should not trigger on transients.

It has been found that there is a danger that, after the current sensing relay contacts have opened, the PTC device will reduce the current to a level below the drop-out level of the current sensing relay before the voltage across the PTC device reaches the level required to pull-in the voltage sensing relay. With the current sensing relay dropping-out, the contacts reclose, thereby restoring the fault current, and the cycle of opening and reclosing of the current sensing relay contacts may repeat continuously. This "bussing" or "chattering" can cause the contacts to fuse together. This problem cannot be overcome by using a single voltage sensing relay having a sufficiently low pull in voltage (while also meeting the drop-out level requirement described above) because the coil in such a relay must be made with very fine wire which can melt when exposed to the normal system voltage or to surges induced by lightning or by inductive coupling to switching transients in parallel AC power lines.

Preferred embodiments of the invention provide a solution to this problem.

In one embodiment, the voltage sensing relay is a latching relay with a pull-in voltage low enough to ensure that the voltage contacts open before the current in the circuit drops below the drop-out current of the current relay; and a second latching relay is placed in parallel with the first relay, the second relay having a higher pull-in voltage than the first relay and controlling contacts which disconnect both relays. At least one, and preferably both, of the latching relays are DC relays, because latching DC relays are more readily available than latching AC relays. This solution not only prevents chattering of the current relay contacts, but also isolates the downstream circuit and the voltage relays; this makes the circuit safer for field personnel and ensures that neither the protection system nor the other circuit components can be damaged by lightning or other surges.

Another, less preferred, embodiment is to add a plurality of additional voltage relays, each in parallel with the voltage relay and each other, and with progressively higher pull-in voltages. The voltage relay with the highest pull-in voltage has a coil which will not be damaged by the normal system voltage. Each additional voltage relay controls a switch which will completely disconnect the "original" voltage relay and the additional voltage relay or relays having a lower pull-in voltage.

BRIEF DESCRIPTION OF THE DRAWINGS

The invention is illustrated in the accompanying drawings, in which.

DETAILED DESCRIPTION OF THE INVENTION

Figure 1:
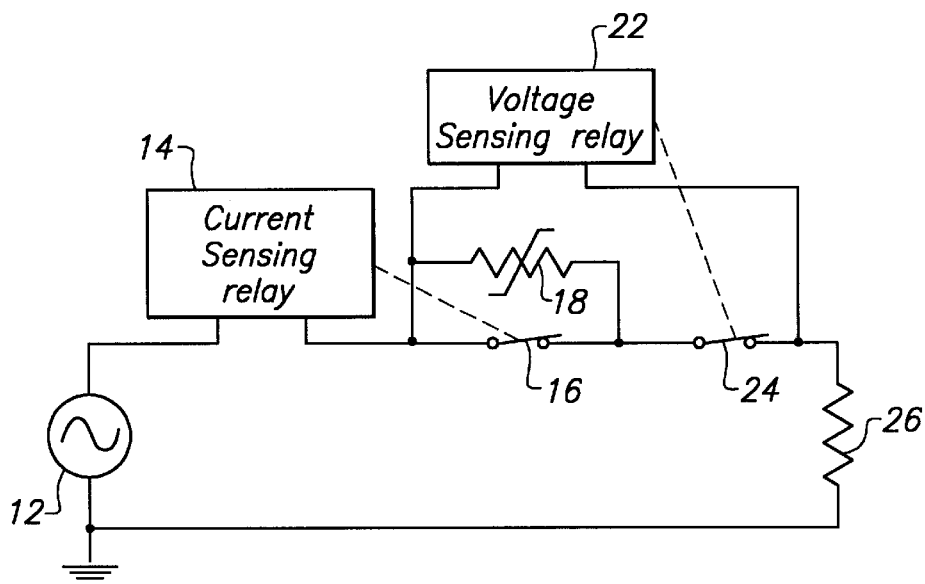
FIGS. 1, 3, 4 and 5 are circuit diagrams of circuits in accordance with the invention.
Figure 2A:
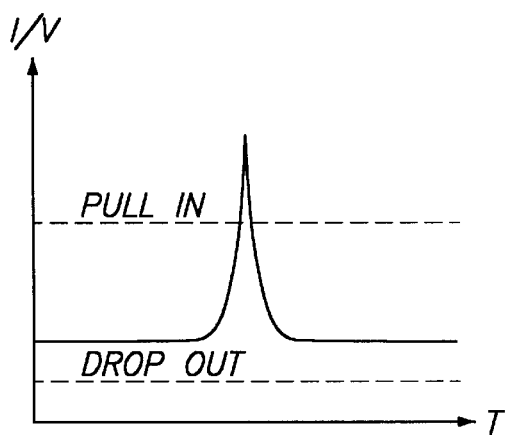
FIGS. 2a and 2b are curves which illustrate the effect of different pull-in and drop-out levels of the current sensing relay in response to a transient condition.
Figure 2B:
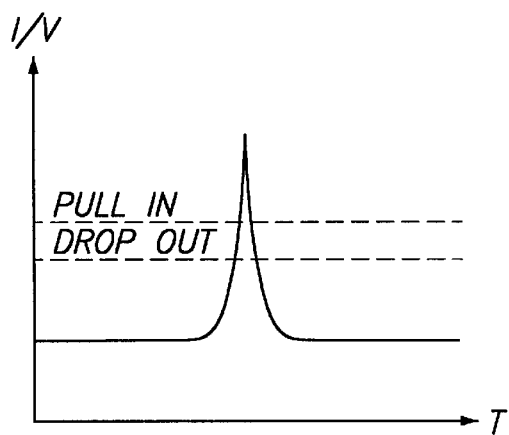

FIG. 1 shows a circuit which includes a PTC device 18, a current sensing relay 14 and a first voltage sensing relay 22. The current sensing relay 14 is coupled to a first set of contacts 16, and the first voltage sensing relay 22 is coupled to a second set of contacts 24. The current sensing relay 14 performs the function of sensing the current in the circuit. When it detects an overcurrent condition, it opens the first set of contacts 16, thus diverting the current to the PTC device 18. Normally the resistance of the PTC device 18 is smaller than the resistance of the first voltage sensing relay 22, so most of the current flows through the PTC device 18. The PTC device 18 increases in resistance, thereby limiting the current in the circuit 10, and applies a voltage across the first voltage sensing relay 22. When the voltage across the first voltage sensing relay 22 reaches the level necessary to energize the first voltage sensing relay 22, the first voltage sensing relay 22 opens the second set of contacts 24. This transfers the system voltage to the voltage relay coil, thus ensuring that the contacts 24 continue to open and remain open so long as the voltage coil is energized. The current continues to flow through the load and the first voltage sensing relay 22, but is limited by the resistance of voltage relay 22. The circuit can be reset by interrupting the current through the voltage coil, which can be done by means of a manual reset mechanism or a reset coil which can be operated remotely (neither being shown in FIG. 1).

Figure 3:
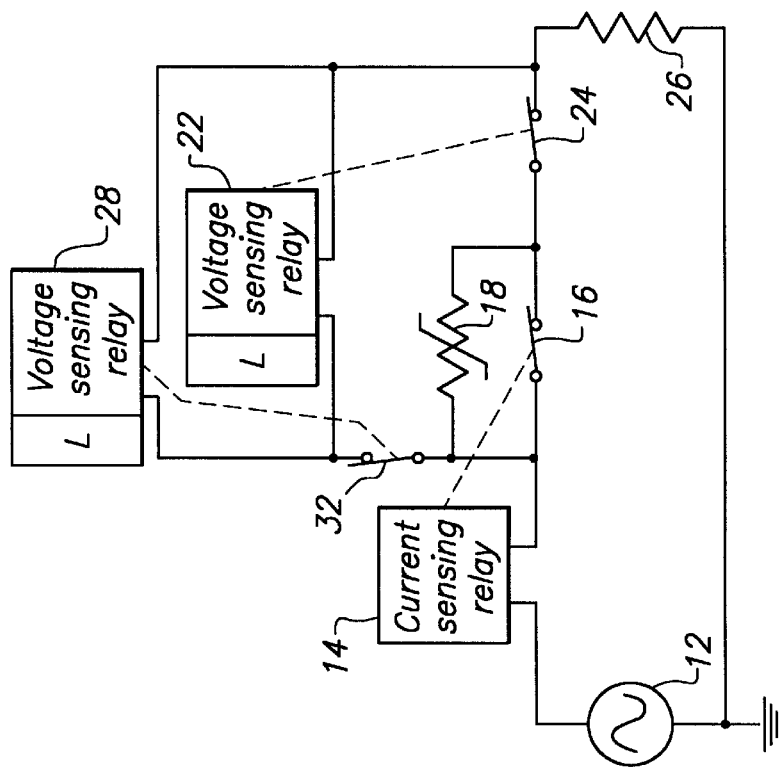

The circuit in FIG. 3 employs two voltage sensing relays 22,28 coupled in parallel. A first latching voltage sensing relay 22 has a pull-in voltage low enough to ensure that the second set of contacts 24 open before the current in the circuit drops below the drop-out level of the current sensing relay 14. A second voltage sensing relay 28 has a higher pull-in voltage than the first voltage sensing relay 22 and controls a third set of contacts 32 which disconnects both voltage sensing relays 22,28 from the circuit.

Figure 4:
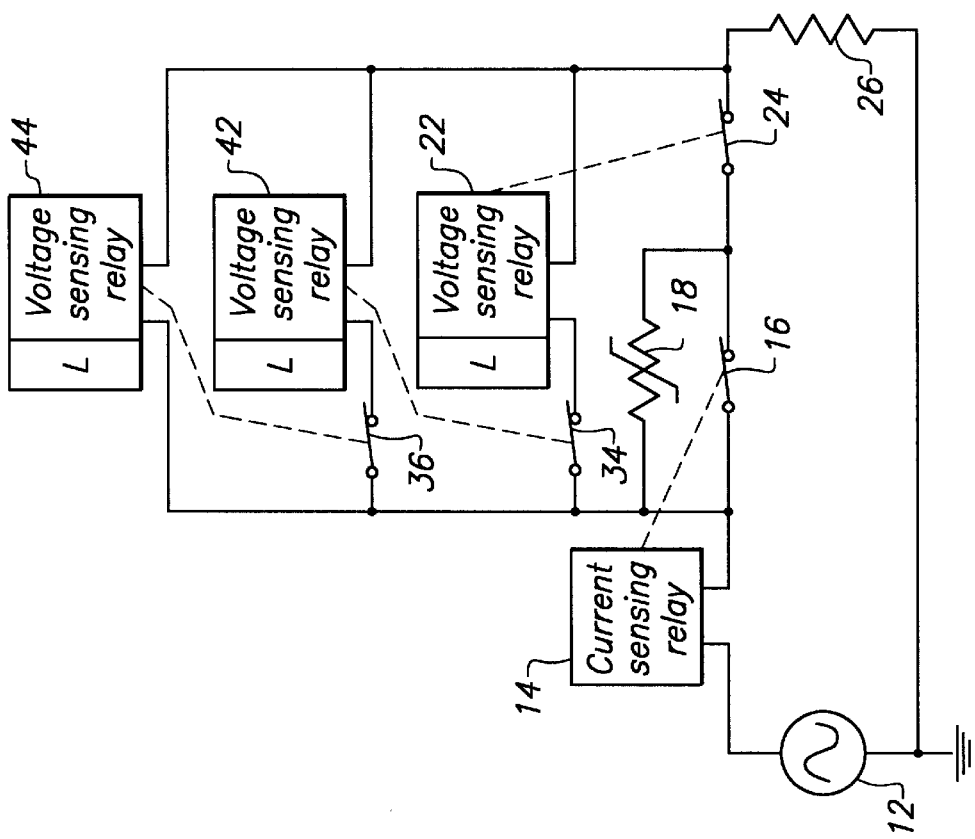

An alternative circuit is shown in FIG. 4, in which three (or more, three shown in FIG. 4) voltage sensing relays 22,42,44 are coupled in parallel. Each succeeding voltage sensing relay coil has a higher pull-in voltage than the previous, and, as the voltage across the parallel assembly increases, the relay coils energize in sequence, with each succeeding relay disconnecting the previous relay from the circuit. Thus, only that last relay in the assembly need carry the full system voltage.

Figure 5:
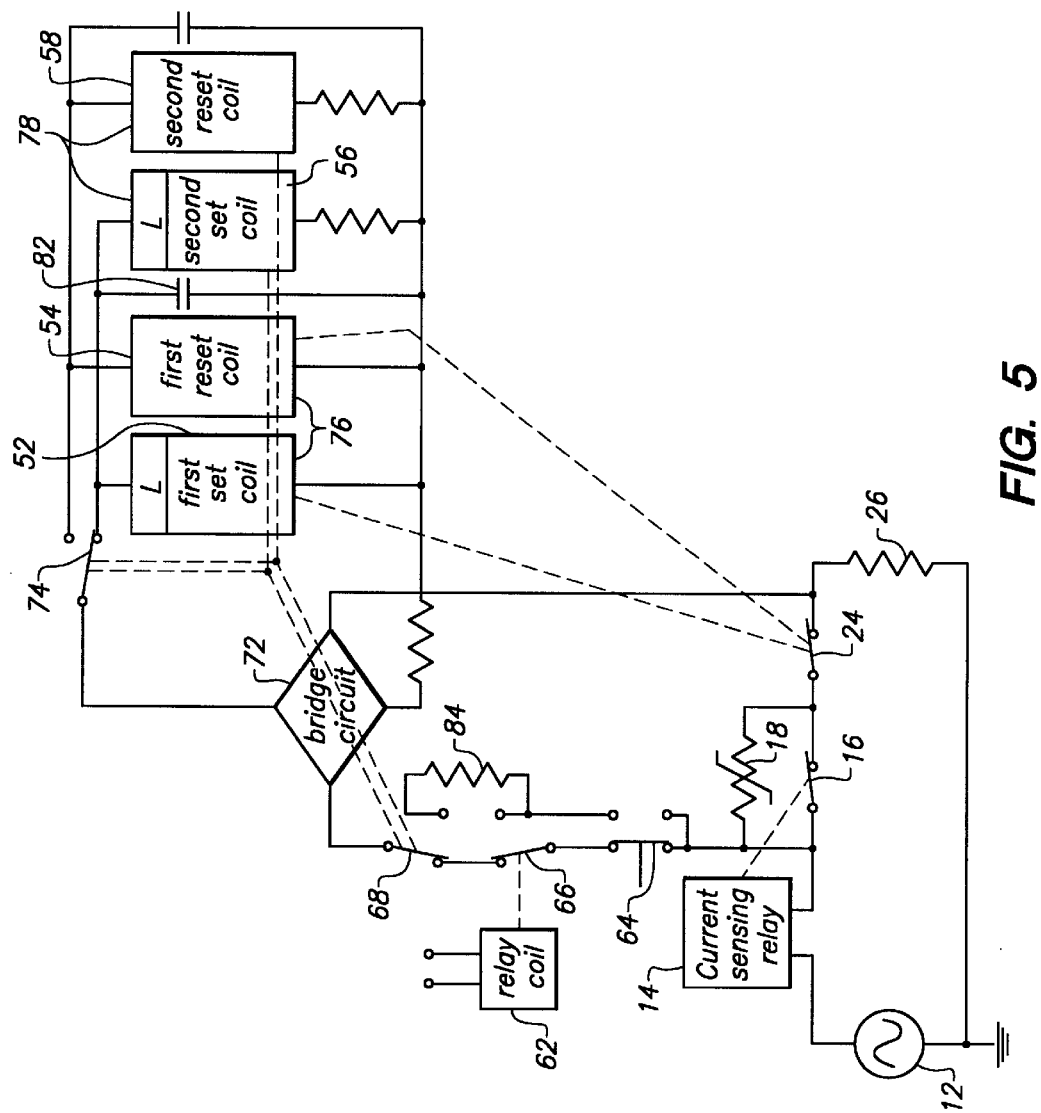

In the circuit shown in FIG. 5, a first latching DC voltage relay 76 is used in place of the voltage relay 22 of FIG. 3. The first latching DC voltage relay 76 has two coils 52,54, a first set coil 52 for switching the first latching DC voltage relay contacts 24 to the open position, and a first reset coil 54 for returning the first latching DC voltage relay contacts 24 to the closed position. The bridge circuit 72 converts AC to rectified DC. When the voltage across the PTC device 18 increases to the pull-in voltage of the first set coil 52, the first set coil 52 energizes causing the first latching DC voltage relay contacts 24 to switch to the open circuit position. The first latching DC voltage relay 76 latches in this position.

A second latching DC voltage relay 78 also has two coils 56,58, a second set coil 56 for switching two sets of contacts 68,74, and a second reset coil 58 for resetting the two sets of contacts 68,74. The second set coil 56 has a higher pull-in voltage than the first set coil 52. When the first latching DC voltage relay contacts open 24, the voltage across the bridge circuit 72 rises. As the voltage rises, the pull-in voltage of the second set coil 56 is reached, and the second set coil 56 energizes. The two sets of contacts 68, 74 switch, disconnecting the bridge circuit 72 from the AC input, and thereby deenergizing the set coils 52,56 of both relays. A first capacitor 82 completes the switching action after the system voltage has been removed.

At the conclusion of the switching event, the contacts 24,68,74 of both voltage sensing relays 76,78 are open, and zero current flows from input to output. No power is dissipated when the circuit is in the tripped state, and the downstream load is electrically isolated from the system voltage. This presents a less hazardous condition for field personnel, and protects delicate coil windings from lightning and other transient sources.

When the two sets of contacts 68,74 switch to their set position, the first and second reset coils 54,58 are connected to the bridge circuit 72. The circuit may be reset manually, for example by means of a push button 64, or remotely by means of an additional relay coil 62 and associated contacts 66. Resetting by either means connects power through the bridge circuit 72 to the first and second reset coils 54,58. A resistor 84 may be included to prevent an overvoltage condition which might cause arcing or damage to the relay coils.

What is claimed is:

1. An electrical system which can be connected between an electrical power supply and an electrical load to form an operating circuit, and which when so connected protects the circuit from overcurrents, the system having a normal operating condition and a fault condition, and comprising:
    (1) a current sensing means having
        (a) a current deenergized state, when the current passing through it does not exceed a normal current, $I_{NORMAL}$, by a predetermined current amount, and
        (b) a current energized state, when the current passing through it has exceeded the normal current, $I_{NORMAL}$, by the predetermined current amount;
    (2) a first circuit switch which is coupled with the current sensing means and which is
        (a) closed when the current sensing means is in the current deenergized state, and
        (b) open when the current sensing means is in the current energized state;
    (3) a voltage sensing means having
        (a) a voltage deenergized state when the voltage across the voltage sensing means does not exceed a predetermined voltage amount, and
        (b) a voltage energized state when the voltage across the voltage sensing means exceeds the predetermined voltage amount;
    (4) a PTC device; and
    (5) a second circuit switch which is coupled with the voltage sensing means and which is
        (a) closed when the voltage sensing means is in the voltage deenergized state, and
        (b) open when the voltage sensing means is in the voltage energized state;
the first circuit switch and the PTC device being connected in parallel with each other; the second circuit switch being connected in series with the parallel combination of the first circuit switch and the PTC device; and
the voltage sensing means being connected in parallel with the series combination of (i) the second switch and (ii) the parallel combination of the first circuit switch and the PTC device.

2. A system according to claim 1 wherein:
    a. the current sensing means comprises a current sensing relay coil;
    b. the first circuit switch comprises a first set of contacts coupled with the current sensing relay coil;
    c. the voltage sensing means comprises a voltage sensing relay coil; and
    d. the second circuit switch comprises a second set of contacts coupled with the voltage sensing relay coil.

3. A system according to claim 2 wherein the combination of the current sensing relay coil and the first set of contacts has a drop-out current which is above $I_{NORMAL}$ and a pull-in current which is not more than P times $I_{NORMAL}$ where P is 3.

4. A system according to claim 3 wherein P is 2.

5. A system according to claim 3 in which said voltage relay coil and said second set of contacts have a first pull-in voltage and latch open when the voltage across the coil exceeds the first pull-in voltage; and which further comprises
    (6) an auxiliary voltage sensing relay coil which is connected in parallel with said voltage sensing relay coil, and
    (7) an auxiliary set of contacts which is
        (a) coupled with the auxiliary voltage sensing relay coil, and
        (b) when it is open, disconnects said voltage relay coil and the auxiliary voltage sensing relay coil;
    the auxiliary voltage sensing relay coil and the auxiliary set of contacts having a second pull-in voltage which is higher than the first pull-in voltage and latching open when the voltage across the auxiliary voltage sensing relay coil exceeds the second pull-in voltage.

6. A system according to claim 5 wherein said voltage sensing relay coil and the auxiliary voltage sensing relay coil are DC relay coils.

7. A system according to claim 3 which further comprises a plurality of additional voltage relay coils, each having an associated set of contacts coupled thereto; the additional voltage coils and the associated sets of contacts having different pull-in voltages, each of the pull-in voltages being higher than the pull-in voltage of said voltage relay coil and said second set of contacts; and each of the associated sets of contacts, when open, completely disconnecting said voltage relay and any additional voltage coil having a lower pull-in voltage.

* * * * *